United States Patent
Levina et al.

[11] 3,780,564
[45] Dec. 25, 1973

[54] FLUE GAS DEW POINT TEMPERATURE TRANSDUCER

[76] Inventors: Tatyana Abramovna Levina, ulitsa Snaiperskaya, 10, korpus 1, kv. 69; Mikhail Borisovich Serkh, ulitsa Moskvina, 5, kv. 46, both of Moscow; Ivan Georgievich Guzynin, Oktyabrsky propekt, 403, korpus 8, kv. 63, Ljubertsy Moskovskoi Oblasti, all of U.S.S.R.

[22] Filed: May 16, 1972

[21] Appl. No.: 253,729

[52] U.S. Cl. .............................................. 73/17 A
[51] Int. Cl. ............................................ G01n 25/02
[58] Field of Search ................... 73/17 A, 29, 336.5

[56] References Cited
UNITED STATES PATENTS

| | | | |
|---|---|---|---|
| 3,552,186 | 1/1971 | Sproul | 73/17 |
| 3,559,456 | 2/1971 | Lomker et al. | 73/29 |
| 3,374,658 | 3/1968 | Ford | 73/17 |
| 3,460,373 | 8/1969 | Ford | 73/17 |

*Primary Examiner*—Herbert Goldstein
*Attorney*—Eric H. Waters et al.

[57] ABSTRACT

A flue gas dew point temperature transducer having a heated shell with primary cell electrodes and a thermoelement disposed on the portion of the shell surface which serves as a flue gas vapor condensation area. Cooling said condensation area is effected by a coolant supplied to and led off said condensation area by a coolant inlet and a coolant outlet duct mounted inside the transducer shell. One of the ducts forms a helix wound around the other duct, whereby the measurement accracy is enhanced and the transducer application range is extended.

3 Claims, 1 Drawing Figure

PATENTED DEC 25 1973  3,780,564
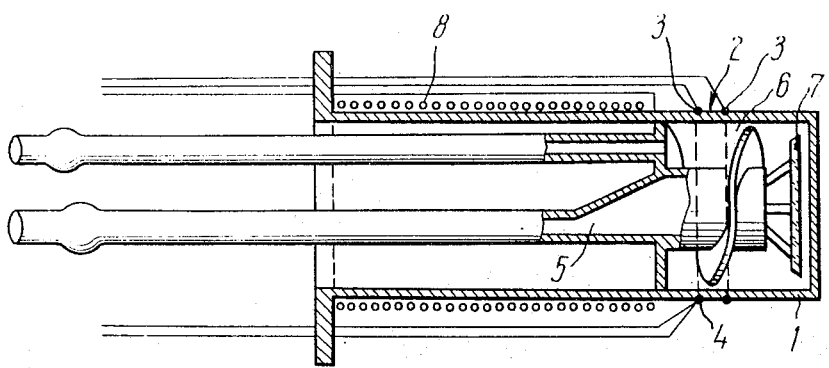

FLUE GAS DEW POINT TEMPERATURE TRANSDUCER

This invention relates to the field of instrumentation and, more particularly, to flue gas dew point temperature transducers.

A flue gas dew point temperature transducer is known in the art comprising a heated shell having primary cell electrodes and a thermoelement disposed on the shell surface portion, on which there occurs the condensation of vapours from the flue gas under examination, said shell surface portion being cooled by a coolant supplied via a coolant inlet duct inside said shell and thereafter discharged therefrom.

In said prior art transducer the shell is made in the form of a metal tube whose cavity serves as a coolant inlet duct, while the coolant is led off the tube surface portion, on which there occurs the condensation of vapours from flue gases and which is disposed on the tube side, via the tube end disposed in opposition to the inlet end.

Said transducer design characterized by the presence of a coolant inlet duct and means for coolant discharge is disadvantageous in that it does not make possible to uniformly cool the entire surface of vapour condensation from flue gases, whereby the error of measurement is increased significantly.

The use of a liquid coolant such as, for example, water in the known transducer provides for lowering the temperature of the vapour condensation surface to the dew point temperature of flue gases, but is practically incapable of accurately measuring the dew point of test flue gases. The latter drawback of the known transducer is associated with the fact that high flow rates of the coolant used cause so pronounced a cooling of the vapour condensation surface that recording the dew point of test flue gases is impracticable, a further drawback being that carrying out flue gas dew point measurements repeatedly involves a prolonged period of time for bringing the transducer to the initial state characterized by the vapour condensation surface temperature essentially higher than the dew point temperature of test flue gases.

On the other hand, where the coolant flow rate is low, the coolant inlet duct will be filled but partly, thereby causing pronounced non-uniformity of condensation surface cooling and, hence, rendering it impossible to evaluate the true dew point temperature from the measured condensation surface temperatures.

Using a gaseous cooling agent cannot eliminate completely the non-uniformity of vapour condensation surface cooling and at the same time diminishes markedly the measurement range.

It is an object of the present invention to provide a flue gas dew point temperature transducer having an enhanced measurement accuracy and a broader measurement range.

To the accomplishment of said object there is provided a flue gas dew point temperature transducer comprising a heated shell furnished with primary cell electrodes and a thermoelement disposed on the shell surface portion on which flue gas vapours undergo condensation and which shell surface portion is cooled by a coolant supplied via a coolant inlet duct disposed inside said shell and thereafter discharged from said shell wherein, according to the present invention, the coolant is led off the flue gas vapour condensation area via a coolant outlet duct also disposed inside the shell so as to be in communication with the coolant inlet duct, one of said ducts being wound in the form of a helix about the other duct.

In a preferred embodiment of the transducer, according to the present invention, provision is made for a clearance between the inner surface of the heated shell and the helical duct, said arrangement being conducive to enhancing the efficiency of cooling the surface onto which there condense the vapours contained in the flue gases under test.

It is further expedient to provide in close vicinity to the exit side of the coolant inlet duct a screen mounted so as to obtain a clearance between said screen and the interior surface of the transducer shell.

The transducer of the present invention is noted for its superior measurement accuracy, can find a wide range of applications, and has moderate overall dimensions.

The present invention is illustrated hereinbelow by the description of a specific embodiment thereof with reference to the accompanying drawing, which shows the general view of the flue gas dew point temperature transducer in longitudinal section with cut-away coolant inlet and outlet ducts.

The present flue gas dew point temperature transducer comprises a cylindrical shell 1 made from a heat-insulating material having also electric insulating properties, said material being quartz glass in the transducer embodiment described herein, but a metal with an electric insulating coating is also suited for this application. Primary cell electrodes 3 and a thermoelement 4 are disposed on the portion of the shell 1 which serves as a flue gas vapour condensation area 2. The electrodes 3 are made in the form of parallel rings in embracing relationship to the condensation area 2, while the thermoelement 4 is connected to or made integral with one of the electrodes 3.

Cooling the condensation area 2 is effected by means of a coolant fed to and led off said area 2 via a coolant inlet duct 5 and a coolant outlet duct 6, respectively. The inlet duct 5 is made in the form of a tube disposed inside the shell 1 and connected to the outlet duct 6 which comprises a tube wound in the form of a helix around the inlet duct 5 and located within the shell 1 in the vicinity of the condensation area 2.

Provision is made for a clearance between the internal surface of the shell 1 and the coolant outlet duct 6.

The aforesaid design of the coolant outlet duct 6 makes for the uniform cooling of the condensation area 2 and, hence, improves essentially the measurement accuracy.

In another embodiment of the present transducer, the coolant inlet duct 5 forms a helix wound around the coolant outlet duct 6.

To enhance the efficiency of coolant employment, in the butt end of the cylindrical shell in close vicinity to the exit side of the duct 5 there is mounted a screen 7 made of a heat-insulating material.

A part of the exterior surface of the transducer shell 1 disposed in close proximity to the condensation area 2 is furnished with a heater 8, which effects condensate film evaporation off said condensation area 2.

The heater 8 comprises an electrical coil that embraces the shell 1 and lies on heat-conductive material layer (not shown in the drawing), said heat-conductive material layer being useful in that it provides for an enhanced efficiency and uniformity of heating the condensation area.

The transducer is designed so that the condensation area 2 contacts the flue gases under examination, while the rest of the shell 1 is enclosed in a casing (not shown in the drawing) made of a dielectric and heat-insulating material, provision being made in said casing for channels accommodating the leads from the primary cell electrodes 3 and the thermoelement 4, and from the heater 8 to appropriate recorders and a power supply, respectively.

The procedure employed for measuring the dew point temperature of a test flue gas by means of the transducer of the present invention is as follows.

The transducer is placed in the stream of a test flue gas and heated by the hot test gas or the heater 8 in order to remove a condensate film from the condensation area 2. Now the transducer is ready for carrying out dew point measurements, which commence with the step of supplying into the transducer a coolant with a view to cooling the condensation area 2, the inlet and outlet ducts 5 and 6 being designed so as to make possible the employment of either a liquid or a gaseous coolant, whereby the measurement range and application field of the present transducer are substantially extended.

The coolant is introduced via the duct 5 and, on being protected with the screen 7 from heating effects exerted by the butt end of the cylindrical shell 1, enters the duct 6 and flows therethrough causing vigorous and uniform cooling of the condensation area 2. Superior cooling efficiency is also provided by the presence of the screen 7 and the availability of a clearance between the duct 6 and the interior surface of the shell 1.

Cooling proceeds until there forms a condensate film on the condensation area 2, said condensate film being responsible for the appearance of an electromotive force between the electrodes 3 of the primary cell. The temperature measured by the thermoelement 4 as there commences the process of condensation is the dew point temperature of the flue gas under test.

The fact that the electrodes 3 of the primary cell are made in the form of rings renders transducer operation independent of aerodynamic parameters of the test gas stream, while a substantial improvement of measurement accuracy and reliability is attained thanks to integrating the thermoelement 4 with one of the electrodes 3.

It is preferable to effect the evaporation of the condensate film thus formed by heating the condensation area 2 with the heater 8.

Where the test flue gas temperature is below the dew point temperature of said flue gas, dew point measurements should be carried out by heating the condensation area 2 with the heater 8 and recording the temperature of condensate film evaporation.

The design of the coolant inlet and outlet ducts is conducive to enhancing the accuracy and extending the range of dew point temperature measurements.

The present transducer can be used advantageously in systems intended for continuous dew point measurements.

The design features inherent in the transducer of the invention make it suited for dew point temperature measurements in a broad range and provide the possibility of using any type of liquid or gaseous coolants.

The present transducer is further noted for its performance reliability in dust-loaded gases irrespective of aerodynamic parameters of the test gas streams.

An essential improvement of measurement accuracy and substantial measurement range broadening stem from the design of the coolant inlet and outlet ducts.

The transducer of the invention is adapted for operation in gases having a temperature below their dew point temperatures.

We claim:

1. A flue gas dew point temperature transducer comprising: a shell, a part of the external surface of said shell serving as a flue gas vapor condensation area; two electrodes of a primary cell disposed on said flue gas vapor condensation area; a thermoelement disposed on said flue gas vapor condensation area; a coolant inlet duct disposed within said shell adapted to feed a coolant to the interior of said shell for cooling said flue gas vapor condensation area; a coolant outlet duct disposed within said shell and in communicating with said coolant inlet duct, one of said ducts being made in the form of a helix wound around the other of said ducts, said helix in spaced relationship with the inner surface of said shell so as to permit uniform flow of Coolant along said inner shell surface in at least the area of said flue gas vapor condensation; and means for heating said shell.

2. A transducer of claim 1, said space between the internal surface of said shell and said helical duct forming an annular clearance adapted to enhance the efficiency of cooling of said flue gas vapor condensation area.

3. A transducer of claim 1, comprising a heat-insulating material screen being positioned in said shell, said screen extending in proximate spaced relationship across the coolant outlet end of said coolant inlet duct, said screen being disposed at a clearance with the internal surface of said shell.

* * * * *